(12) United States Patent
Boglaev

(10) Patent No.: US 7,567,927 B2
(45) Date of Patent: Jul. 28, 2009

(54) MARKET MOTION DETECTOR

(75) Inventor: Yuri Boglaev, Laurel, MD (US)

(73) Assignee: Ameritrade IP Company Inc., Omaha, NE (US)

( * ) Notice: Subject to any disclaimer, the term of this patent is extended or adjusted under 35 U.S.C. 154(b) by 205 days.

(21) Appl. No.: 11/244,090

(22) Filed: Oct. 6, 2005

(65) Prior Publication Data

US 2006/0080227 A1   Apr. 13, 2006

Related U.S. Application Data

(60) Provisional application No. 60/616,220, filed on Oct. 7, 2004.

(51) Int. Cl.
*G06Q 40/00* (2006.01)
(52) U.S. Cl. .......... 705/35; 705/36 R
(58) Field of Classification Search ........... 705/35, 705/36 R, 37; 708/131–132, 134; 434/107, 434/109, 211
See application file for complete search history.

(56) References Cited

U.S. PATENT DOCUMENTS

| 6,012,042 | A | 1/2000 | Black et al. |
| 7,082,575 | B2* | 7/2006 | Lin et al. .......... 715/771 |
| 7,212,997 | B1* | 5/2007 | Pine et al. .......... 705/36 R |
| 2001/0051907 | A1* | 12/2001 | Kumar et al. .......... 705/36 |
| 2002/0004776 | A1* | 1/2002 | Gladstone .......... 705/37 |
| 2002/0026404 | A1* | 2/2002 | Thompson .......... 705/37 |
| 2002/0055899 | A1* | 5/2002 | Williams .......... 705/37 |
| 2002/0147671 | A1 | 10/2002 | Sloan et al. |
| 2004/0111357 | A1* | 6/2004 | Downs, II .......... 705/37 |
| 2004/0128225 | A1 | 7/2004 | Thompson et al. |
| 2005/0187851 | A1* | 8/2005 | Sant .......... 705/36 |
| 2006/0241949 | A1* | 10/2006 | Tobias et al. .......... 705/1 |

FOREIGN PATENT DOCUMENTS

WO   WO 2004/061729 A2   7/2004

OTHER PUBLICATIONS

N Labia, Price Velocity and Dynamics, Mar. 1961, The Economic Journal, vol. 71, No. 281, pp. 66-78.*
J.V. Anderson et al, Fundamental Framework for "technical analysis" of market prices, Mar. 2000, The European Phsycial Journal B-Condensed Matter and Complex Systems—Abstract at www.springerlink.com/content/bmlf1k4f4gbqrhnu/.*

(Continued)

*Primary Examiner*—Mary Cheung
*Assistant Examiner*—Brian Fertig
(74) *Attorney, Agent, or Firm*—Miles & Stockbridge P.C.

(57) ABSTRACT

To enhance information available to a user, such as a trader, an exemplary embodiment allows users to quickly and easily identify stocks with the highest speed change per unit time and acceleration, or rate of change of speed. More specifically, exemplary aspects at least allow users to visualize for one or more securities: the price speed, which is the percentage change per unit time; the price acceleration, which is the rate of change of price speed; the accumulation speed, which is the percentage change per time unit greater than zero; the accumulation acceleration, which is the rate of change of accumulation speed; the distribution speed, which is the percentage change per unit time less than zero; and the distribution acceleration, which is the rate of change of accumulation speed, all of which can be provided in, for example, a graphical format similar to a "speedometer."

18 Claims, 11 Drawing Sheets

OTHER PUBLICATIONS

Discount stock brokers getting analytical Darrell Jobman, Susan Bisset. Futures. Chicago: Oct. 2002. vol. 31, Iss. 13; p. 58.*

Notification of Transmittal of The International Search Report and the Written Opinion of the International Searching Authority, or the Declaration dated Nov. 29, 2006.

N Labia, Price Velocity and Dynamics, Mar. 1961, the Economic Journal, vol. 71, No. 281, pp. 66-78.

J.V. Anderson et al., Fundamental Framework for "technical analysis" of market prices, Mar. 2000, The European Physycial Journal B-Condensed Matter and Complex Systems-Abstract at www.springerlink.com/content/bmlf1k4f4gbqrhnu/.

* cited by examiner

Fig. 7

MARKET MOTION DETECTOR

RELATED APPLICATION DATA

This application claims the benefit of and priority under 35 U.S.C. § 119(e) to U.S. patent application Ser. No. 60/616,220, filed Oct. 7, 2004, entitled "Market Speedometer," which is incorporated herein by reference in its entirety.

BACKGROUND

1. Field of the Invention

This invention generally relates to data analysis. In particular, this invention relates to the determination and display of information associated with securities.

2. Description of Related Art

Technical analysis of the market is the examination and study of price movements in an attempt to guess future price movement. This guess can be based on historical and/or a real-time view of price fluctuations. Technical analysts are sometimes referred to "chartists" because they typically rely on charts and graphical information for analysis and market predictions. Technical analysis is usually applied to stocks, bonds, commodities, futures, or in general any tradable instrument where there are price fluctuations. This technical analysis is usually limited to a time frame, although the time frame can be anything from intraday, which can, for example, be based on the tick, or in 5-minute, 10-minute, hourly, daily, weekly, bi-weekly, or monthly intervals or any other time period for which price data is available, including historical information.

Since an objective of market analysis is to attempt to predict future price changes, technical analysts traditionally regard price changes associated with the particular stock very highly under the assumption that variations in price typically occur before changes in that stock price. One tool used for the analysis of these trends or patterns is price charts. Price charts illustrate a graph of the price of a particular stock, commodity, or the like, over a time frame. These price charts are usually configured so that the x-axis represents a time frame with the y-axis representing a price point. Any security which has a price that changes over a given period of time can be charted for technical analysis.

Additionally, charts can illustrate the rate of change of price for a given commodity and/or any other metric used to reflect a commodities position or activity in the marketplace.

SUMMARY

Associated with each market in which securities are traded are data feeds that provide various information such as the stock symbol, last price, change information, volume information, as well as high and low price information. Viewing the price and size movement of particular stocks allows market participants and users to closely follow and sometimes predict the direction and flavor of the market and/or a particular stock.

To enhance the information available to a user, such as a trader, an exemplary embodiment of this invention allows users to quickly and easily identify stocks with the highest speed change per unit time and acceleration, or rate of change of speed. More specifically, exemplary aspects of the invention at least allow users to visualize for one or more securities: the price speed, which is the percentage change per unit time; the price acceleration, which is the rate of change of price speed; the accumulation speed, which is the percentage change per time unit greater than zero; the accumulation acceleration, which is the rate of change of accumulation speed; the distribution speed, which is the percentage change per unit time less than zero; and the distribution acceleration, which is the rate of change of accumulation speed, all of which can be provided in, for example, a graphical format similar to a speedometer.

In addition to the exemplary systems and methods of this invention, being able to track information associated with securities, filtering can be performed to, for example, customize the results displayed to a user. Moreover, the exemplary embodiments allow the placement of an order (buy or sell) of one or more of the securities displayed to the user.

Accordingly, exemplary aspects of this invention relate to the analysis of information.

Additional exemplary aspects of the invention relate to the analysis and comparison of securities data.

Additional exemplary aspects of the invention relate to identifying and displaying bullish price movers. Additional exemplary aspects of the invention relate to identifying and displaying bearish price movers. Further exemplary aspects of the invention relate to identifying and displaying the greatest accumulation of movers.

Still further aspects of the invention relate to identifying and displaying the greatest distribution movers.

Additional exemplary aspects of the invention relate to allowing user selectable output types for the display of the one or more bullish price movers, bearish price movers, accumulation price movers and distribution movers.

Still further aspects of the invention relate to the automatic triggering of an activity based on, for example, trends or specific criteria having been met in the one or more selected views.

Still further aspects of the invention relate to allowing trading from the one or more views displayed to a user.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein:

FIG. 7 illustrates an exemplary user interface showing the bullish price movers, bearish price movers, greatest accumulation movers and greatest distribution movers simultaneously according to this invention;

DETAILED DESCRIPTION

The exemplary systems and methods of this invention will be described in relation to a securities data tracking system.

However, to avoid unnecessarily obscuring the present invention, the following description omits well-known structures and devices that could be shown in block diagram form or otherwise summarized. For the purpose of explanation, numerous specific details are set forth in order to provide a thorough understanding of the present invention. It should be appreciated, however, that the present invention may be practiced in a variety of ways beyond the specific details set forth herein. For example, while the systems and methods of this invention will be described in relation to the applicability of the invention to the securities data, it should be appreciated that the system can be adapted to analyzing any type of information that varies over time. Moreover, it should be appreciated that the system can be adapted to any type of trading in any foreign or domestic market.

Furthermore, while the exemplary embodiments illustrated herein show the various components of the system colocated, it is to be appreciated that the various components of the system can be located at distant portions of a distributed network, such as a telecommunications network and/or the Internet, or with a dedicated market motion system. Thus, it should be appreciated that the various components illustrated herein can be combined into one or more devices or colocated on a particular node(s) of a distributed network such as a telecommunications network, the Internet, a private network, a secured or unsecured network, or any combination thereof. It will be appreciated from the following description, and for reasons of computational efficiency that the components of the market motion system can be arranged at any location within a distributed network without affecting the operation of the system. Moreover, it should be appreciated that the various links connecting the elements can be wired or wireless links, or any combination thereof, or any other known or later-developed element(s) that is capable of supplying and/or communicating data to and from the connected elements. Additionally, the terms module and engine as used herein can refer to any known or later-developed hardware, software, or combination of hardware or software that is capable of performing the functionality associated with that element.

Figure 1:
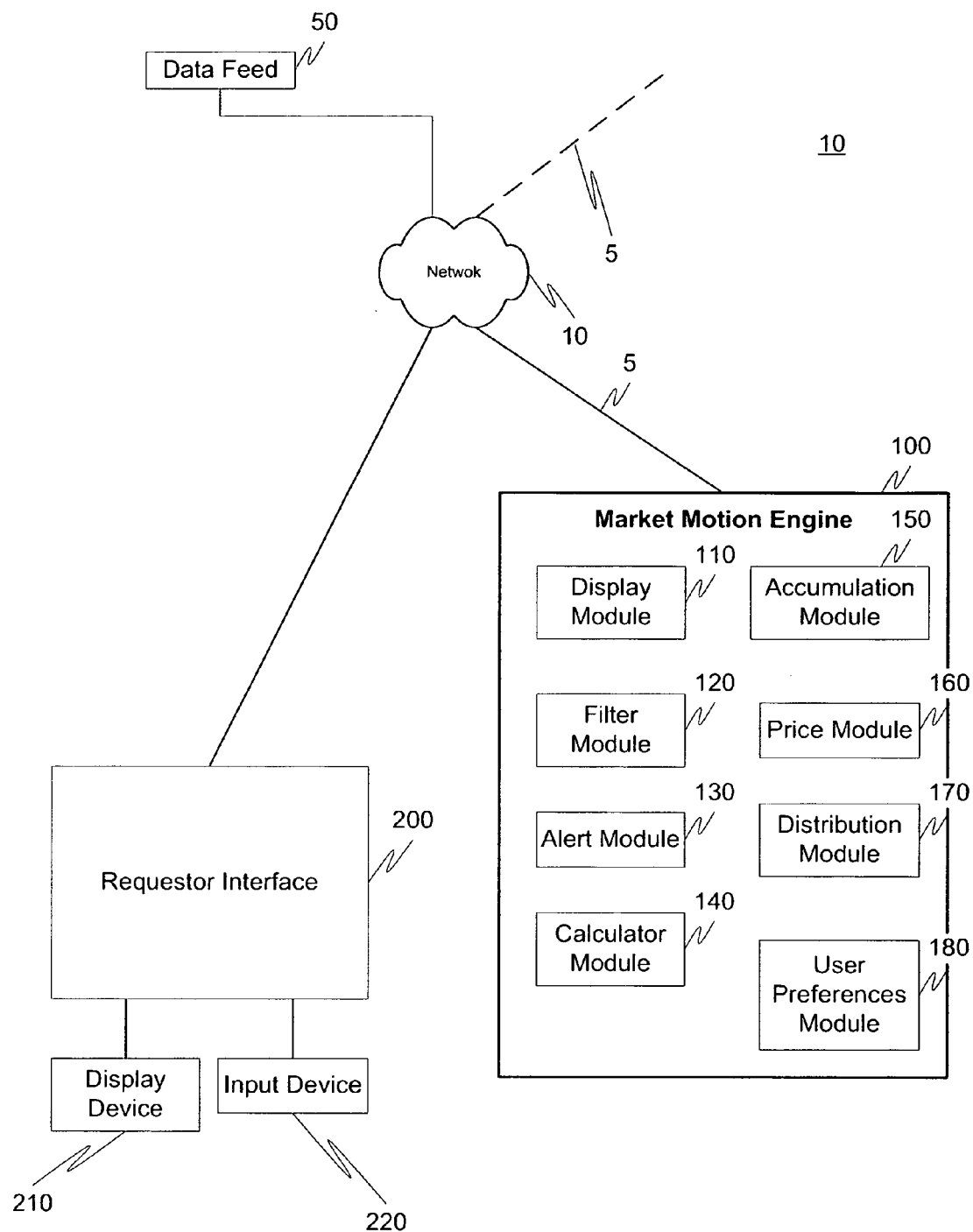
FIG. 1 illustrates an exemplary market motion system according to this invention.

FIG. 1 illustrates an exemplary embodiment of the market motion system 10. The market motion system 10 comprises a market motion engine 100, a requestor interface 200, and a data feed 50, all interconnected by one or more links 5 and one or more networks 10. The market motion engine 100 comprises a display module 110, a filter module 120, an alert module 130, one or more calculator modules 140, an accumulation module 150, a price module 160, a distribution module 170 and a user preferences module 180. The requestor interface 200, for example, a personal computer, is further connected to one or more display devices 210, such as a monitor, and one or more input devices 220 such as a mouse, keyboard, drawing tool, or the like.

In operation, the market motion engine 100 receives data from one or more data feeds 50. These data feeds can be securities information and the information therefrom optionally stored in a data store (not shown).

A user, utilizing the requester interface 200, selects a time interval over which data is to be analyzed. In addition, the user selects one or more views for display on the display device 210. As previously discussed, these views can be the bullish view, bearish view, the accumulation view and/or the distribution view. Associated with each of these views, the user can select an output type for the view such as a tabular format, a speedometer format, or in general any format including user definable formats that may be useful to a user. Upon receipt of this information, the market motion engine 100, in association with one or more calculator modules 140, acquires and analyzes data from the data feed 50 for the requested time interval. This time interval can be real-time, historical, or specify a future time interval during which the system is desired to operate. The calculator module 140, having analyzed the incoming data from the data feed 50, then cooperates with the applicable module based on the one or more views selected by the user. Each of these view modules, i.e., the accumulation module 150, the price module 160, and the distribution module 170, cooperate with the display module 110 to assemble the results in the appropriate format which can be forwarded back to the user via link 5 and network 10 at the requester interface 200. The results can then be displayed, for example, on display device 210.

The requestor interface 200 can operate, for example, as a client in a client-server type architecture with the market motion engine 100 acting as the server. Additionally, the requestor interface 200 can be, for example, a personal computer having a processor, memory, I/O interface, and other well-known components that are not illustrated. Moreover, the requestor interface 200 could be an application, such as a script or applet that provides an interface between the user and the market motion engine 100. However, and in general, it should be appreciated that the requestor interface 200 can be embodied in any configuration and could also be a part of or connected directly to the market motion engine 100.

The filter module allows a user to select and apply one or more filters to the one or more selected views. Exemplary types of filters are price filters, projected volume filters, time interval selection filters, exchange filters, watchlist filters and number of displayed top results filter.

More particularly, the price filter can include upper and lower thresholds for prices as well as the ability to select all prices. The projected volume filter can also have upper and lower thresholds as well as the ability to select "any projected volume." For example, the projected volume filter can operate on a linear volume prediction algorithm and perform appropriate projected volume calculations at any point in time of the day.

The time interval filter allows users to select any time interval over which the analysis by the one or more calculator modules 140 is to be performed. The exchange filter allows users to select one or more exchanges, such as the listed exchanges (NYSE, NASDAQ, etc,) or in general any exchange be it foreign or domestic.

The watchlist list filter allows users to select one or more watch lists that may be present in a user's portfolio management database for which the market motion engine 100 is to perform analysis. The number of top results filters allows users to select the number of top results that shall be displayed for each of the selected views.

It should be appreciated that each of the various types of filters and the settings selected therein can be associated with and saved, in conjunction with the user preferences module 180, for each of the individual or groups of views selected. For example, when a user logs into the system, their preferences can be retrieved from the user preferences module 180 and the displayed information modified based on the applicable filters.

As previously discussed, a user interacting with the market motion engine 100 can select the one or more views for presentation as well as the output type for each view. The output type can be tabular, as illustrated in FIGS. 3-10, or speedometer format, as illustrated in FIG. 11. Each of these views are fully customizable and, for example, in the tabular view, the user can adjust the column widths, colors, fonts, refresh rate or in general any display attribute associated with the particular view. Similarly, in a speedometer view, a user can adjust the size of the speedometer, colors, refresh rate, or in general any attribute associated with the particular view. Moreover, the placement on the screen of any view can be adjusted and this placement can optionally be stored for future sessions in cooperation with the user preferences module 180. Additionally, in conjunction with each view, the market motion engine 100 can display the time when the results were last updated, the time when the results were first displayed in the output, a message window (not shown) were messages regarding system status and the like can be displayed, and/or the filter settings applicable to that particular view.

The market motion engine 100 utilizes the calculator module 140 to analyze the data from the data feed 50 which then cooperates with one or more of the accumulation module 150, price module 160, and distribution module 170 to determine the information for display. The price module 160 is utilized to analyze information for display as either a bullish or bearish price mover. Should a user select the bullish price mover view, a number of top results, based on user preferences which can be stored on the user preferences module 180, are displayed. For each result, one or more of the following data fields can be displayed to the user: symbol and description, and optionally the full company name; last, last trade time, change, price speed, price acceleration, interval price change (for example in percentage), projected volume for time interval and, optionally, the user can have the ability to view trade trend information based, for example, on a 10-minute interval. In addition, as with any of the displayed information, the user can have the ability, for example through a right-click of the mouse, to buy and sell, acquire daily activity information about, acquire charting information, add the security to a portfolio, or in general see any information about the particular selected security and/or perform an activity based thereon. For the bearish price movers display, results should be displayed only if the symbol's price speed is less than zero.

The bearish price movers display similarly displays a desired number of top results and for each result, specific data fields are displayed to the user. These data fields include: symbol and description, and optionally the full company name; last, last trade time, change, price speed, price acceleration, interval price change (for example in percentage), projected volume for time interval and, optionally, the user can have the ability to view trade trend information based, for example, on a 10-minute interval. In addition, as with any of the displayed information, the user can have the ability, for example through a right-click of the mouse, to buy and sell, acquire daily activity information about, acquire big chart information, add the security to a portfolio, or in general see any information about the particular selected security and/or perform an activity based thereon. For the bullish price movers display, results should also be displayed only if the symbol's price speed is greater than zero.

For the greatest accumulation movers display, the calculator module 140 cooperates with the accumulation module 150 assembles for display the desired number of top results based, for example, on filter settings stored in the user preferences module 180. For each result, the symbol and description information, accumulation speed and time interval can be displayed. Results appear for the greatest accumulation movers if the symbol's accumulation speed is greater than zero.

For the greatest distribution movers display, the calculator module 140 cooperates with the distribution module 170 to assemble for display the desired number of top results based on filter settings in the user preference module 180. For each result, data fields such as symbol and description, last, last trade time, change, distribution speed, distribution acceleration and projected volume for time interval can be displayed to the user. Moreover, as with the other displays, activities such as buy and sell as well as the ability to request additional information can be available. Results will appear in the greatest distribution movers only if the securities distribution speed is less than zero. Moreover, the distribution price movers results can be displayed and sorted by distribution speed from highest to lowest.

The calculator module 140, working with the various views modules 150-170 can output results based on a predefined refresh rate and/or based on a refresh rate specified in the user preferences module 180. The new-net results can be displayed as easily identifiable and distinguishable from the initial symbol results and the new-net results can also include an indicator of the time that they were added to the output, i.e., a results log.

The alert module 130 allows a user to define one or more activities or events that are to be triggered upon predetermined criteria being satisfied. For example, a user can create market motion detector alerts that could be triggered when the set alert criteria is met. A user can create market motion detector alerts for use with any of the views and can optionally be allowed to set any of the following alert conditions collectively in order to create a valid market motion detector alert: security, top of the list, and time interval.

For the security alert condition, a user can select an alert based off a single user-defined watch list from, for example, a portfolio management database. The alert can also be based on all user-defined watch lists from the portfolio management database. The alert can also be based off any signal.

For the top of list alert condition, a user can select an alert if a security appears at the top of the list a predefined number of times where the top of the list is defined as the symbol that has the highest price speed for bullish price movers, the symbol that has the highest price speed for bearish price movers, the symbol that has the greatest accumulation speed for greatest accumulation movers, and the symbol that has the highest distribution speed for the greatest distribution movers. For the top of the list alert condition, a user shall be able to enter a positive integer value for the predetermined number of times.

For the time interval condition, a user can select any of the following options: an alert based on 1 minute, 3 minute, 5 minute, 10 minute, 15 minute, 30 minute, or in general any time interval. For example, a user can establish one or more market motion engine rules for triggering an alert. An exemplary rule could read "For bullish price movers, alert when any symbol appears at the top of list five times within 10 minutes." The alerting methods can include sounds, icons, pop-up dialog boxes, email alerts, or an activity such as buy/sell or in general any function or notification.

When a market motion detector alert fires and the user has selected to be notified, for example, via a pop-up dialog box, the user can receive an alert message that can include various information about the alert such as the view, symbol, top of list, time interval, and time stamp when the alert conditions were met. These alerts are fully customizable and editable, as well as savable in, for example, the user preferences module 180.

Figure 2:
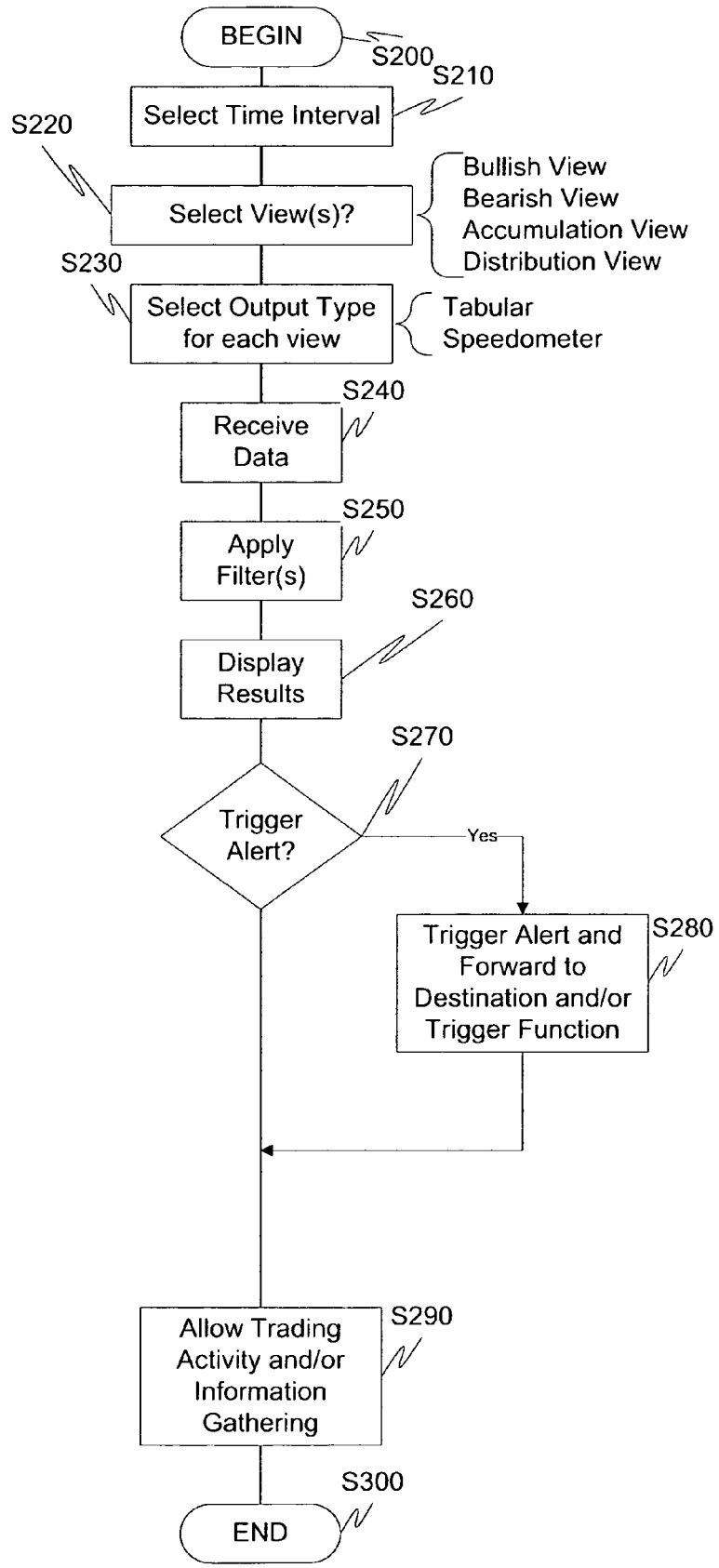
FIG. 2 is a flowchart illustrating an exemplary method of operation of the market motion system according to this invention.

FIG. 2 illustrates an exemplary method of operation of the market motion engine. Specifically, control begins in step S200 and continues to step S210. In step S210, a time interval is selected. Next, in step S220, one or more views for display are selected. These views include bullish, bearish, accumulation and distribution. Then, in step S230, an output type for each view is selected. The exemplary views include tabular and "speedometer." Control then continues to step S240.

In step S240, data is received from one or more data feeds. The data is then analyzed, comparisons made to determine trend information, and filtered in step S250. The results for each of the selected view(s) are then displayed in step S260. Control then continues to step S270.

In step S270, a determination is made whether an alert threshold has been satisfied. If an alert threshold has been satisfied control continues to step S280. Otherwise, control jumps to step S290. In step S280, the activity with the alert is performed, such as a notification and/or function. Control then continues to step S290.

In step S290, trading and/or activity gathering can be optionally performed, for example through a right mouse button selection of a security in one of the views. Control then continues to step S300 where the control sequence ends.

Figure 3:
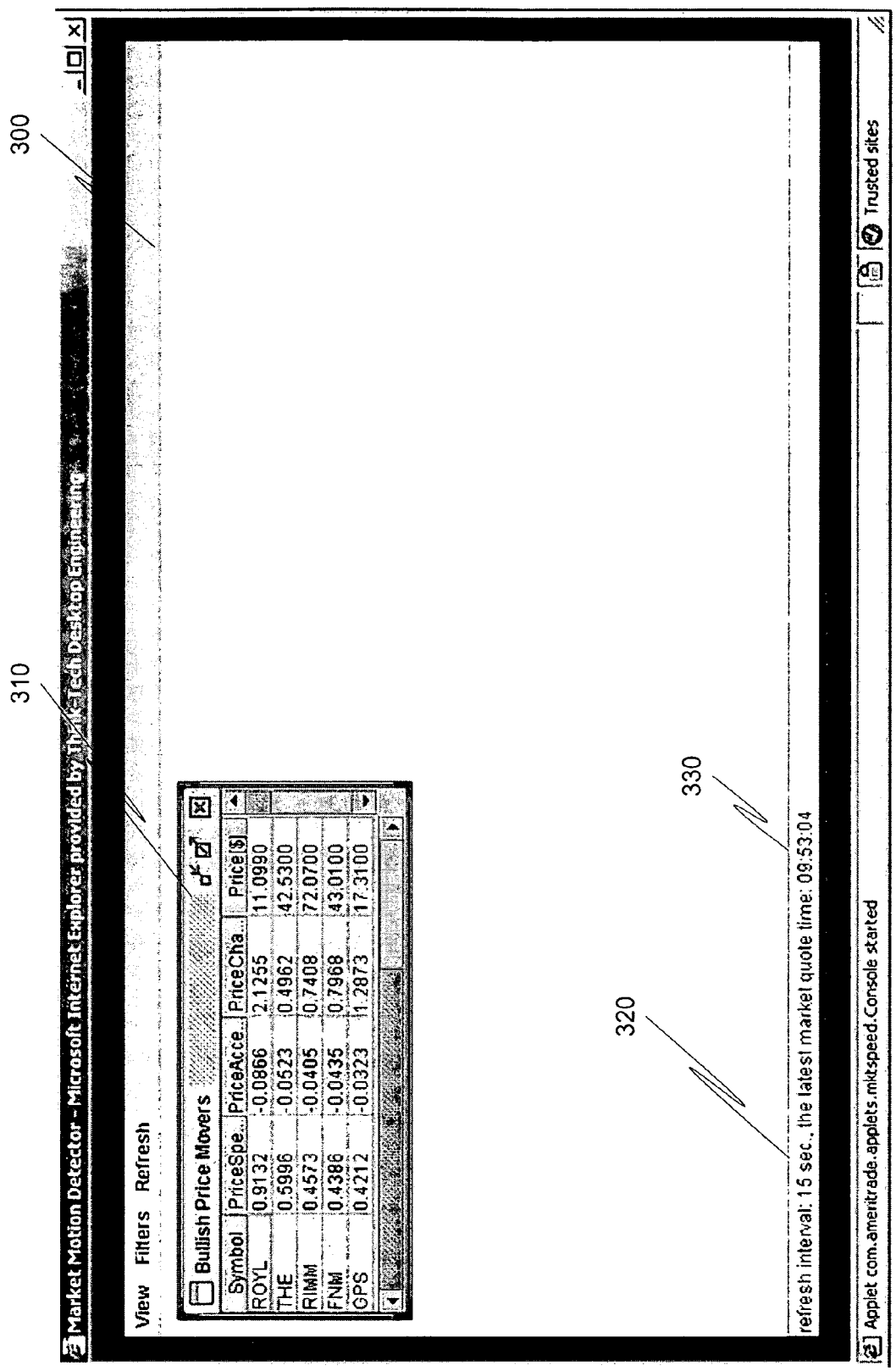
FIG. 3 illustrates an exemplary user interface showing bullish price movers according to this invention.

FIG. 3 illustrates an exemplary user interface 300 that includes a bullish price movers interface 310. In the bullish price movers interface 310, the symbol, and pricing information is displayed in a tabular format. Additionally, the refresh interval is displayed in portion 320 with the latest market quote time illustrated at 330. As with many of the displays illustrated herein, views, filters and refresh menus are selectable from the various interfaces.

Figure 4:
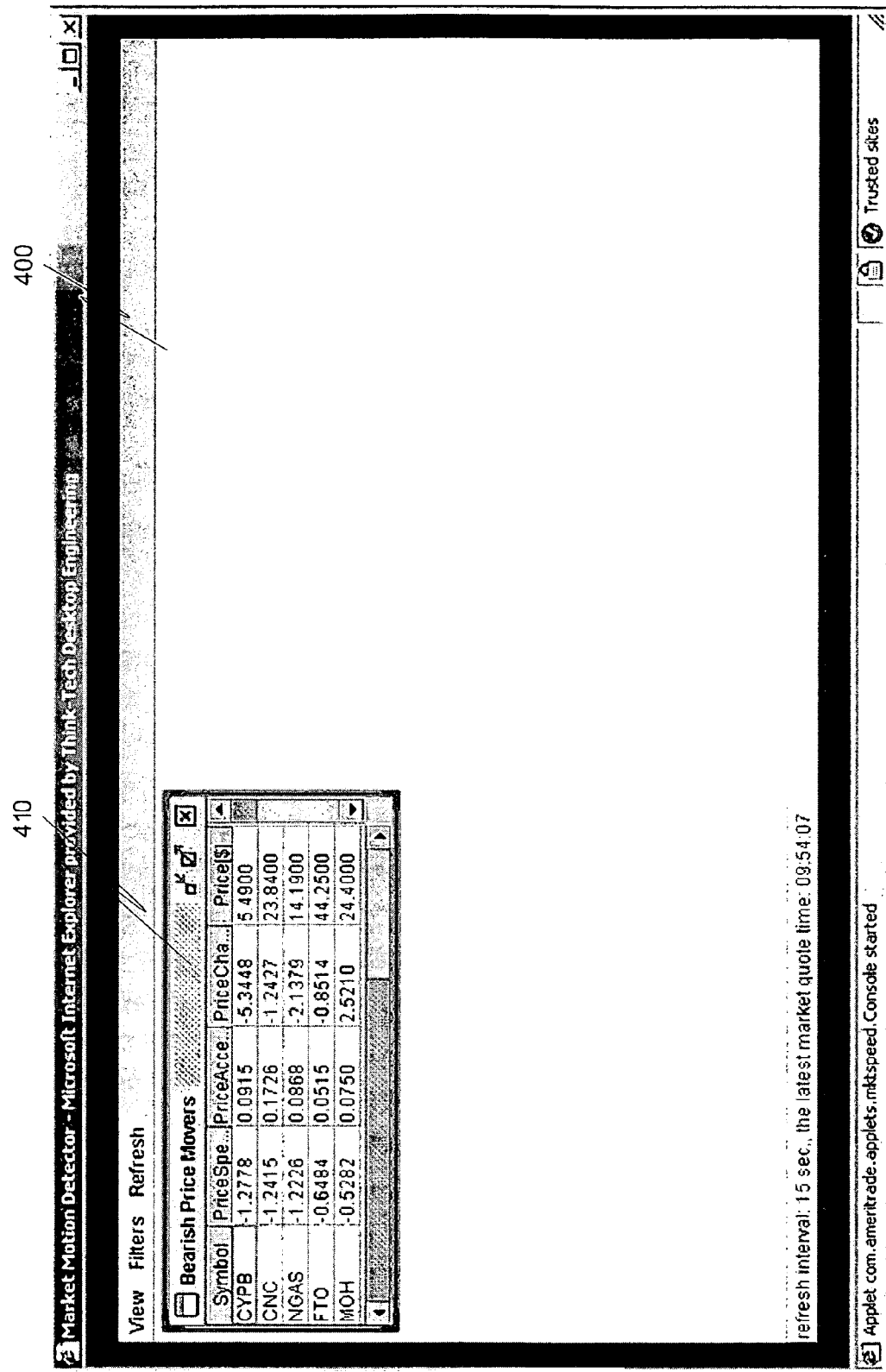
FIG. 4 illustrates an exemplary user interface showing bearish price movers according to this invention.

FIG. 4 illustrates an exemplary user interface 400 displaying a bearish price movers interface 410. The bearish price movers interface 410 includes symbol and price information in a similar manner to the bullish price movers interface 310.

Figure 5:
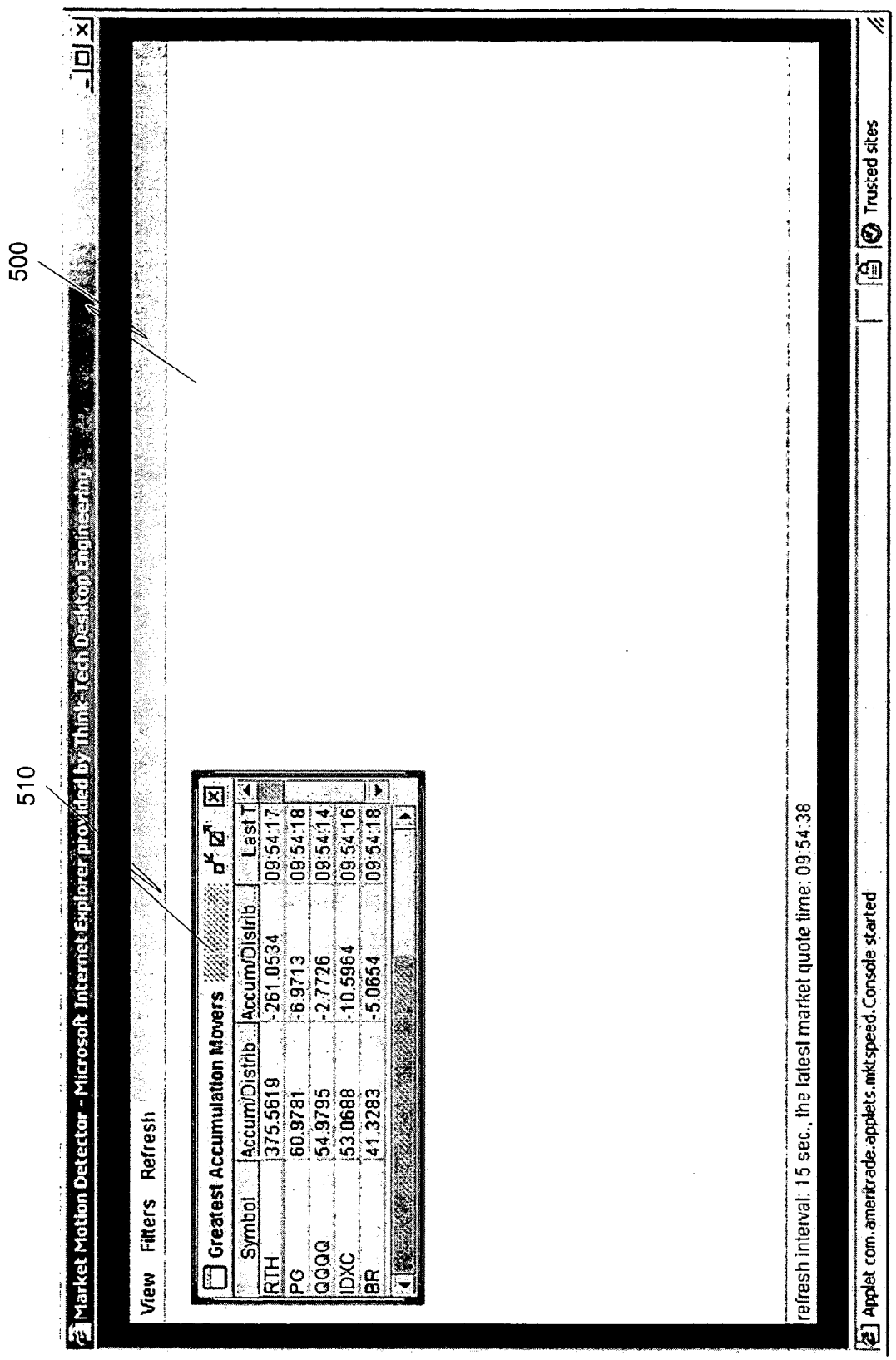
FIG. 5 illustrates an exemplary user interface showing the greatest accumulation movers according to this invention.
Figure 6:
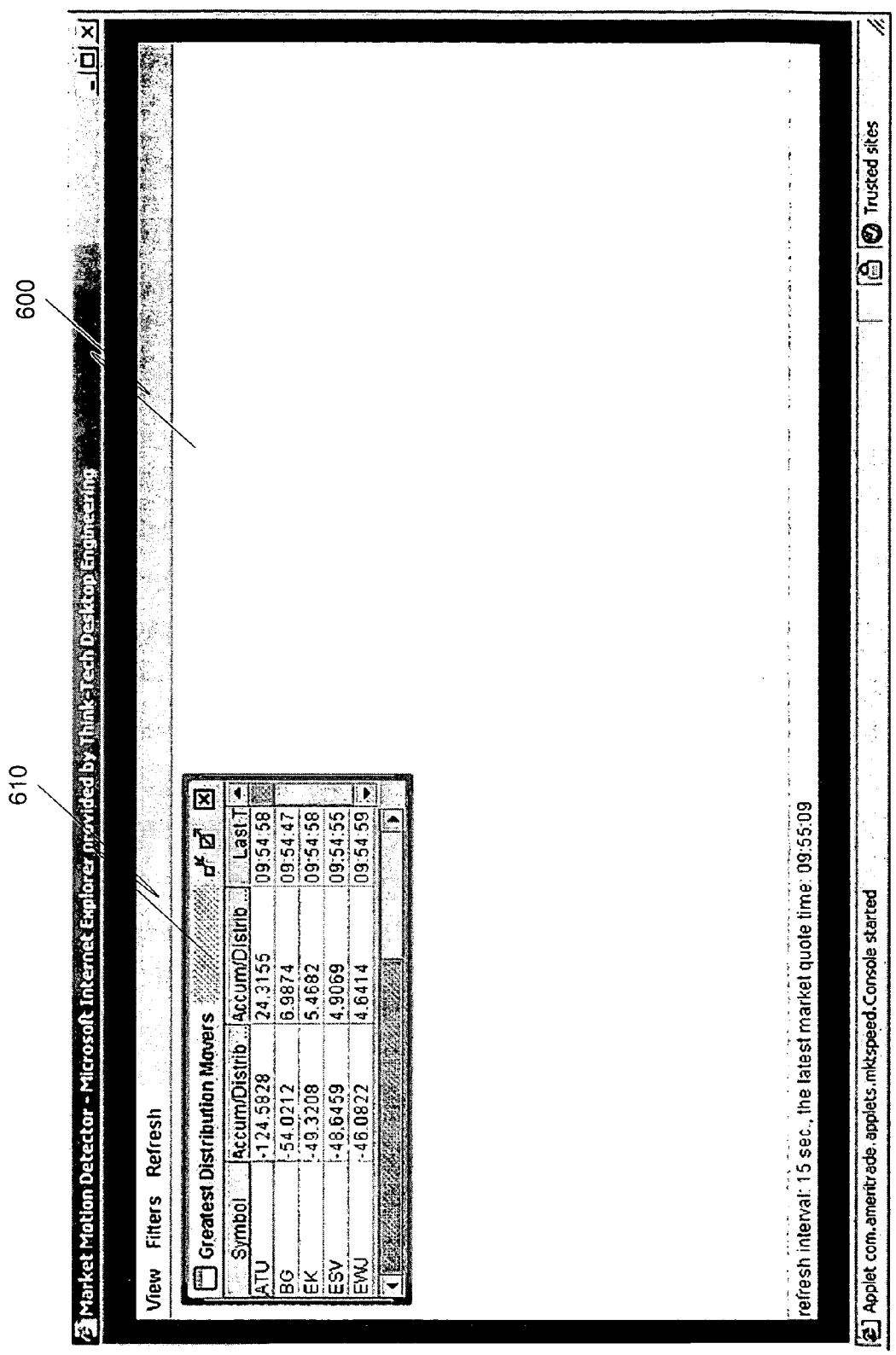
FIG. 6 illustrates an exemplary user interface showing the greatest distribution movers according to this invention.

FIG. 5 illustrates an exemplary user interface 500 illustrating the greatest accumulation movers interface 510. The greatest accumulation movers interface 510 includes symbol information, accumulation distribution information, and timing information. FIG. 6 illustrates in user interface 600 the greatest distribution movers interface 610. The interface includes symbol information, accumulation distribution information, and timing information. As with the other interfaces, portions of the interface are selectable for the displaying of information thereabout, such as help text, or sort order or in general any of the functionality commonly seen in user interfaces.

Figure 7:
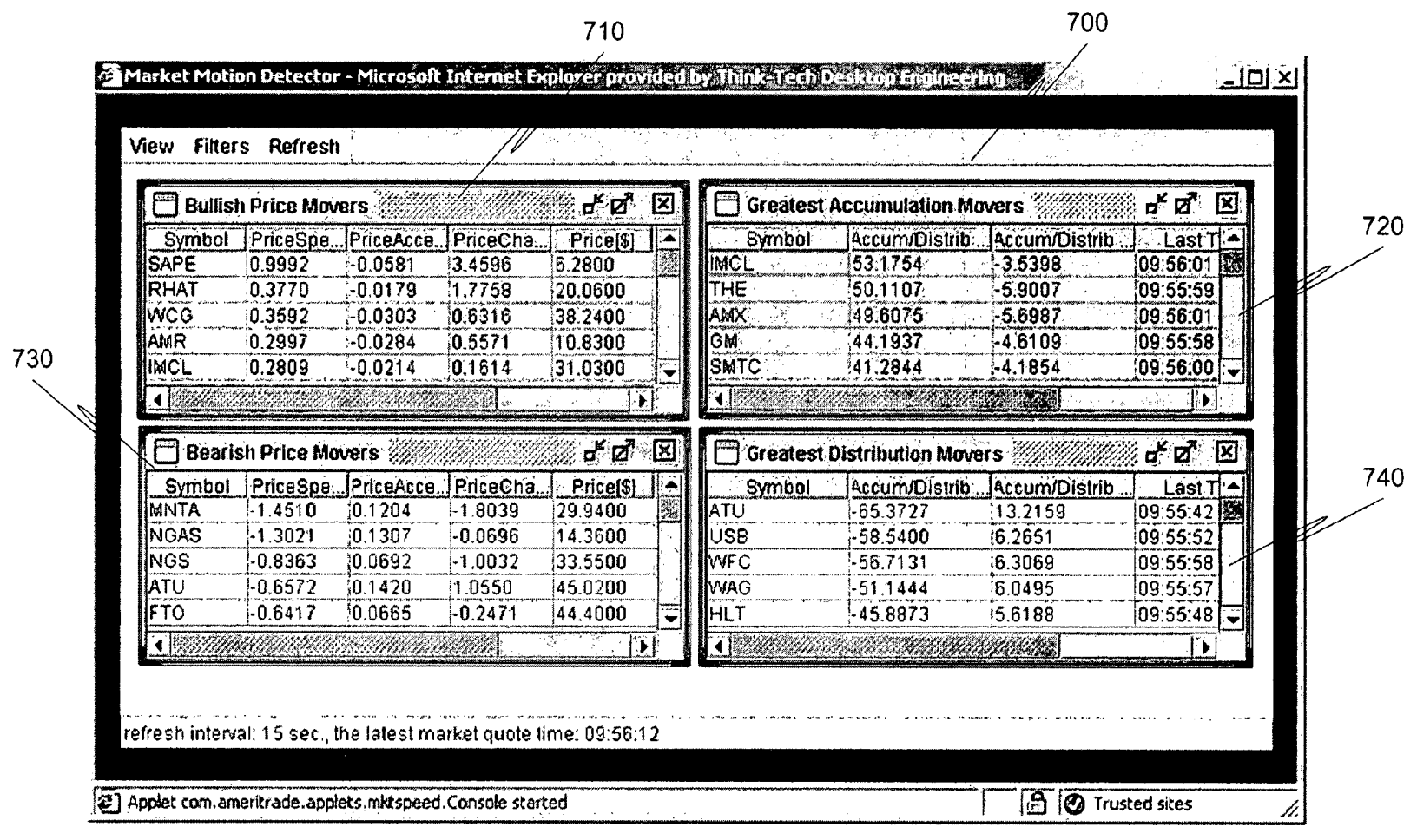
Figure 8:
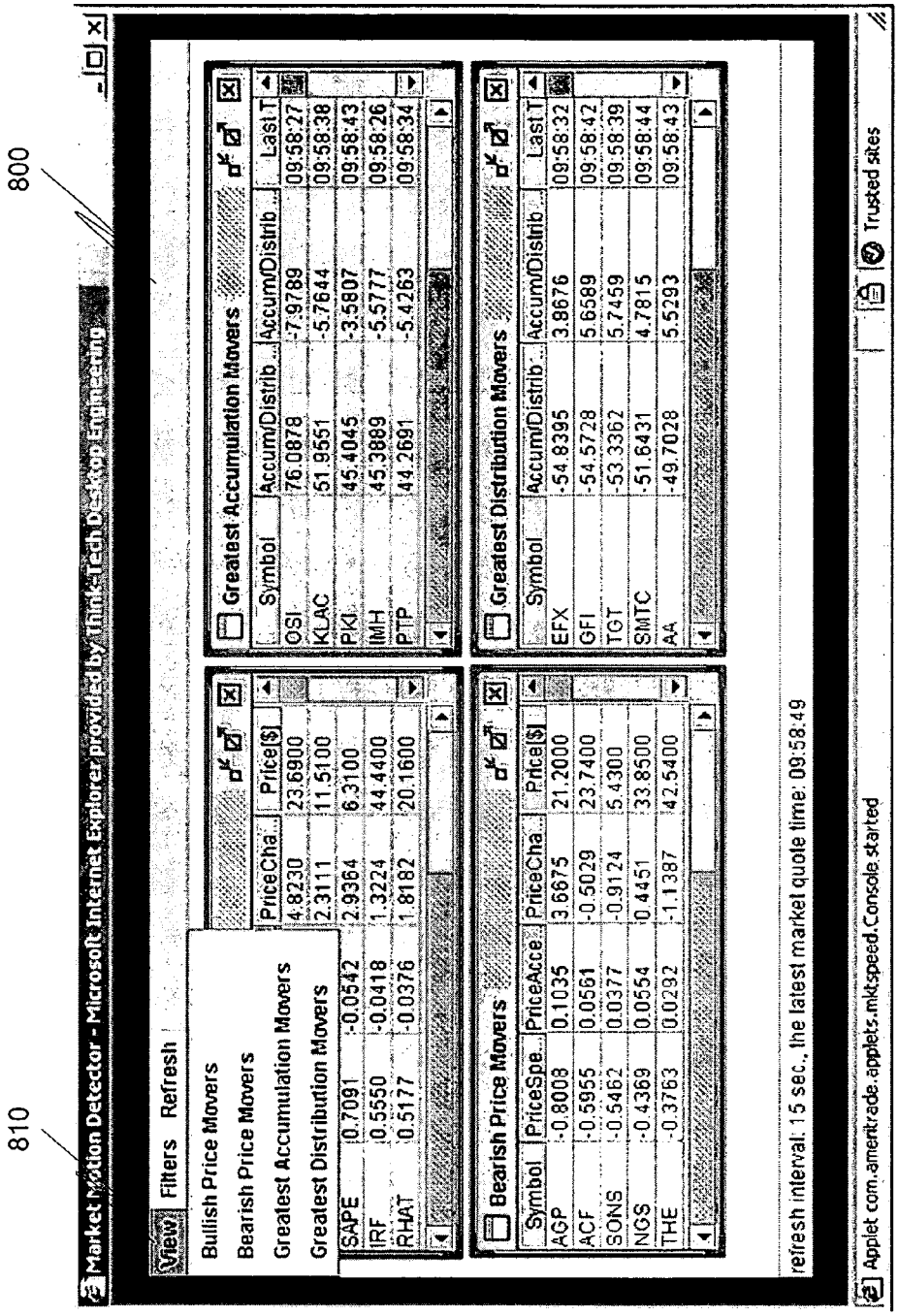
FIG. 8 illustrates an exemplary user interface illustrating the views selectable by a user according to this invention.
Figure 9:
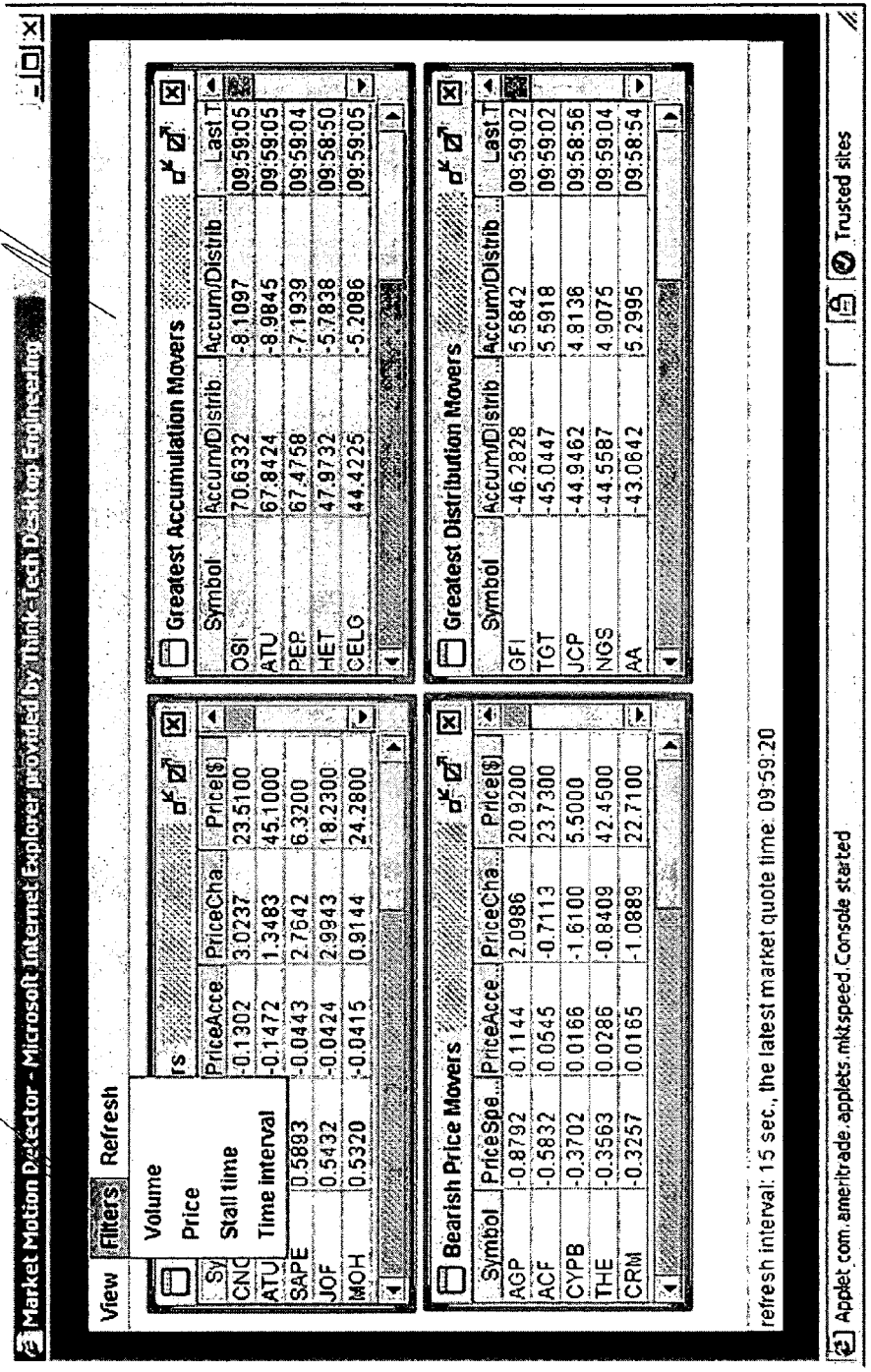
FIG. 9 illustrates an exemplary user interface showing the filters selectable by a user according to this invention.

User interface 700 illustrated in FIG. 7, illustrates all four exemplary views displayed simultaneously. In FIG. 8, each of the different views is selectable, or de-selectable, for display via the menu "view" 810. FIG. 9 illustrates the filter menu that are selectable via interface 910 in user interface 900. From this filter, the filters available to a user are selectable and configurable.

Figure 10:
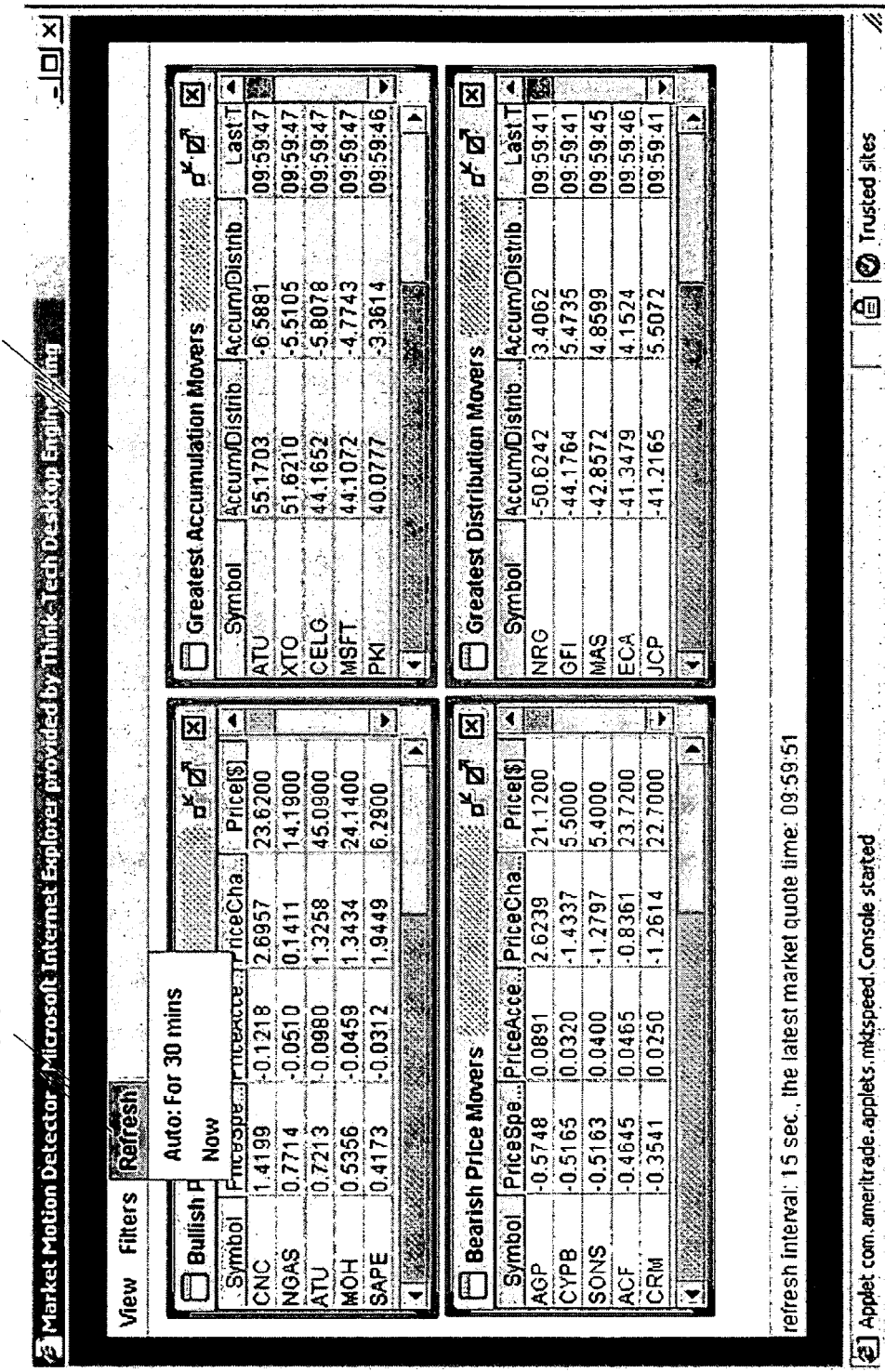
FIG. 10 illustrates an exemplary user interface showing the refresh options available to a user according to this invention.
Figure 11:
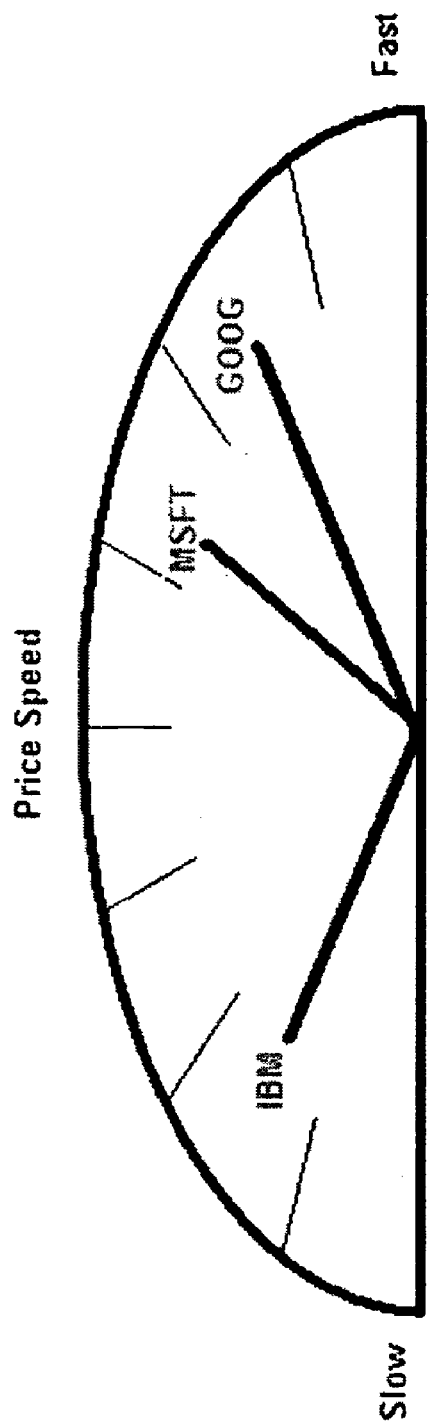
FIG. 11 illustrates an exemplary "speedometer" that can be used with the exemplary embodiments of this invention.

FIG. 10 illustrates an exemplary user interface 1000 highlighting the refresh menu interface 1010 from which a user can select one or more predefined, automatic, and "refresh now" refresh rates.

FIG. 11 illustrates an exemplary view of the "speedometer" type view which can be used in lieu of or in addition to the tabular type views illustrated in FIGS. 3-10. The speedometer view can graphically illustrate similar information to that displayed in the tabular views of the previous figures. As with the tabular displays the speedometer has selectable portions such that with user selection information and/or an activity can be made available to a user.

While the above-described flowcharts have been discussed in relation to a particular sequence of events, it should be appreciated that changes to this sequence can occur without materially effecting the operation of the invention.

The above-described system can be implemented on a computing device, such as a personal computer, PDA, internet enabled telephone, dedicated trading computer, or the like, or a separate programmed general purpose computer having a communications device. Additionally, the systems and methods of this invention can be implemented on a special purpose computer, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a state machine that is in turn capable of implementing the processes described herein can be used to implement the quote and order system according to this invention.

Furthermore, the disclosed methods may readily be implemented in software using object or object-oriented software development environments that provide portable source code that can be used on a variety of computer or workstation platforms. Alternatively, the disclosed system may be implemented partially or fully in hardware using standard logic circuits or, for example, a VLSI design. Whether software or hardware is used to implement the systems in accordance with this invention is dependent on the speed and/or efficiency requirements of the system, particular function, and the particular software or hardware systems or microprocessor or microcomputer systems being utilized. The systems and methods illustrated herein can be readily implemented in hardware and/or software using any suitable systems or structures, devices and/or software, such as JAVA®, by those of ordinary skill in the applicable art from the functional description provided herein and with a basic general knowledge of the computer and telecommunications arts.

Moreover, the disclosed methods may be readily implemented in software executed on a programmed general purpose computer, a special purpose computer, a microprocessor, or the like. In these instances, the systems and methods of this invention can be implemented as a program embedded on a personal computer such as a JAVA®, CGI or Perl script, as a resource resigning on a server or graphics workstation, as a routine embedded in a dedicated trading system, or the like. The systems and methods of this invention can also be implemented by physically incorporating this system and method into a software and/or hardware system, such as the hardware and software systems of a computer.

It is, therefore, apparent that there has been provided, in accordance with the present invention, systems and methods for tracking and displaying market trends. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A machine-implemented securities analysis tool comprising:
    a market motion processor adapted to receive securities data from one or more data feeds via a network;
    said market motion processor comprising one or more calculator modules each adapted to analyze the securities data and to cooperate with one or more views modules of said market motion processor to determine information to be displayed in one or more selectable views, the selectable views including bullish, bearish, accumulation and distribution,
    wherein said one or more views modules include an accumulation module configured determine an accumulation speed and an accumulation acceleration a price module configured to determine a price speed and a price acceleration, and a distribution module configured to determine a distribution speed and a distribution acceleration;
    said market motion processor further comprising a filter module configurable to filter the information to be displayed in the selectable view and further comprising a projected volume filter,
    wherein each said calculator module is further configured to determine a plurality of ranked bullish price movers based on said determined price speed and price acceleration, a plurality of ranked bearish price movers based on said determined price speed and price acceleration, a plurality of ranked greatest accumulation movers based on said determined accumulation speed and accumulation acceleration, and a plurality of ranked greatest distribution movers based on said determined distribution speed and distribution acceleration; and
    said market motion processor further comprising a display module configured to output said plurality of ranked bullish price movers in a first quadrant of a display device, said plurality of ranked bearish price movers in a second quadrant of the display device, said plurality of ranked greatest accumulation movers in a third quadrant of the display device, and said plurality of ranked greatest distribution movers in a fourth quadrant of the display device.

2. The tool of claim 1, said market motion processor further comprising a user preferences module adapted to store preference information associated with one or more of the one or more selectable views and filtering.

3. The tool of claim 1, said market motion processor further comprising an alert module adapted to alert a user when a threshold has been reached.

4. The tool of claim 1, wherein the price speed is a percentage change per unit time for a security, and wherein the price acceleration is the rate of change of price speed for the security.

5. The tool of claim 1, wherein the accumulation speed is a percentage change per time unit greater than zero for a security, and wherein the accumulation acceleration is the rate of change of accumulation speed for the security.

6. The tool of claim 1, wherein the distribution speed is the percentage change per unit time less than zero, and wherein the distribution acceleration is a rate of change of accumulation speed for the security.

7. The tool of claim 1, further comprising a requested interface adapted to display the one or more selectable views.

8. The tool of claim 1, wherein the data feeds include securities information from one or more markets.

9. The tool of claim 1, wherein the projected volume filter is based on a linear volume prediction algorithm.

10. A method of displaying securities information using a market motion processor comprising:
receiving securities data at said market motion processor from one or more data feeds via a communications network;
analyzing, using said market motion processor, the securities data and determining information to be displayed in one or more selectable views, the selectable views including bullish, bearish, accumulation and distribution, said analyzing including determining, based on said received securities data for each of a plurality of securities, an accumulation speed and an accumulation acceleration, a price speed and a price acceleration, and a distribution speed and a distribution acceleration;
filtering, using said market motion processor, the information to be displayed in the one or more selectable views using a projected volume filter;
determining and ranking, using said market motion processor, a plurality of ranked bullish price movers based on said price speed and said price acceleration;
determining and ranking, using said market motion processor, a plurality of ranked bearish price movers based on said price speed and said price acceleration;
determining and ranking, using said market motion processor, a plurality of ranked greatest accumulation movers based on said accumulation speed and said accumulation acceleration;
determining and ranking, using said market motion processor, a plurality of ranked greatest distribution movers based on said distribution speed and said distribution acceleration; and
outputting, using said market motion processor, a portion of said plurality of ranked bullish price movers in a first quadrant of a display device, a portion of said plurality of ranked bearish price movers in a second quadrant of the display device, a portion of said plurality of ranked greatest accumulation movers in a third quadrant of this device, and a portion of said plurality of ranked greatest distribution movers in a fourth quadrant of the display device.

11. The method of claim 10, further comprising storing preference information associated with one or more of the one or more selectable views and filtering.

12. The method of claim 10, further comprising alerting a user when a threshold has been reached.

13. The method of claim 10, wherein said price speed information is a percentage change per unit time for a security, and wherein said price acceleration is the rate of change of price speed for the security.

14. The method of claim 10, wherein said accumulation speed is a percentage change per time unit greater than zero for a security, and wherein said accumulation acceleration is the rate of change of accumulation speed for the security.

15. The method of claim 10, wherein said distribution speed is the percentage change per unit time less than zero, and wherein said distribution acceleration a rate of change of accumulation speed for the security.

16. The method of claim 10, wherein the data feeds include securities information from one or more markets.

17. An information storage machine-readable media having embodied and stored thereon a sequence of programmed instructions which, when executed by a processor, cause the processor to perform securities analysis operations comprising:
receiving securities data from one or more data feeds via a communications network;
analyzing the securities data and determining information to be displayed in one or more selectable views, the selectable views including bullish, bearish, accumulation and distribution, said analyzing including determining, for each of a plurality of securities, an accumulation speed and an accumulation acceleration, a price speed and a price acceleration, and a distribution speed and a distribution acceleration;
filtering the information to be displayed in the one or more selectable views using a projected volume filter;
determining and ranking a plurality of ranked bullish price movers based On said price speed and said price acceleration;
determining and ranking a plurality of ranked bearish price movers based on said price speed and said price acceleration;
determining and ranking a plurality of ranked greatest accumulation movers based on said accumulation speed and said accumulation acceleration;
determining and ranking a plurality of ranked greatest distribution movers based on said distribution speed and said distribution acceleration; and
outputting a portion of said of ranked bullish price movers in a first quadrant of a display device, a portion of said plurality of ranked bearish price movers in a second quadrant of the display device, a portion of said plurality of ranked greatest accumulation movers in a third quadrant of the display device, and a portion of said plurality of ranked greatest distribution movers in a fourth quadrant of the display device.

18. The method of claim 10, wherein the projected volume filter is based on a linear volume prediction algorithm.

* * * * *